(12) United States Patent
Giagni

(10) Patent No.: US 7,350,245 B2
(45) Date of Patent: Apr. 1, 2008

(54) LIQUID LEVEL CONTROL SYSTEM

(76) Inventor: Vincent Giagni, 5 Windsor Ct., Purchase, NY (US) 10577

( * ) Notice: Subject to any disclaimer, the term of this patent is extended or adjusted under 35 U.S.C. 154(b) by 283 days.

(21) Appl. No.: 11/355,723

(22) Filed: Feb. 17, 2006

(65) Prior Publication Data
US 2007/0192954 A1   Aug. 23, 2007

(51) Int. Cl.
E03C 1/00 (2006.01)
F16K 31/00 (2006.01)

(52) U.S. Cl. ............................................. 4/668; 4/623

(58) Field of Classification Search ............... 4/694, 4/668, 623, 508
See application file for complete search history.

(56) References Cited

U.S. PATENT DOCUMENTS 4,258,444 A * 3/1981 Orszullok ...................... 4/538
RE37,888 E * 10/2002 Cretu-Petra .............. 236/12.12

* cited by examiner

Primary Examiner—Huyen Le

(57) ABSTRACT

A liquid level detection and control system having a shut off gate located near the liquid discharge outlet and a liquid level sensor which sends signal to a wireless transmitter when a preset liquid level is detected. The transmitter then transmits signal to an electronic receiver and from there to an electronic circuit which transmit signal to a solenoid operatively associated with the shut off gate to open and close the gate.

8 Claims, 3 Drawing Sheets

LIQUID LEVEL CONTROL SYSTEM

FIELD OF THE INVENTION

This invention relates to liquid level control system and is particularly related to an automatic liquid level control system for bathtubs, sinks or other similar containers to prevent liquid overflow and assure safety.

BACKGROUND OF THE INVENTION

Various liquid level control devices and systems have been described in the prior art and widely used in different households, hotels and other institutions. Some of these systems sound an alarm signal when the liquid reaches a certain level while other systems operate on mechanical liquid level relief principles. Regardless of the control mode, the purpose is to assure safety of the person in a bathtub by alerting such person of the safety level of the liquid, and prevent damage to the floor which may result from liquid overflow.

One bath water level control system is described in U.S. Pat. No. 4,258,444 issued to Wily Orszullok on Mar. 31, 1981. That system is designed for exterior installation relative to the bathtubs and includes a probe or detecting means which is vertically adjustable on the exterior wall of the tub. When the water reaches a predetermined level, the probe emits a signal which activates a device to turn off the inflowing water and/or trip an alarm.

U.S. Pat. No. 6,008,728 issued to Akintunde O. Wesey on Dec. 28, 1999 describes a water level detection and alarm device used for bathtubs. The device comprises a housing which is secured to the interior surface of the tub and includes a float and water level alarm system which sounds an alarm when the water level in the tub reaches a predetermined level.

A tub alarm apparatus is described in U.S. Pat. No. 6,160,482 issued to Timothy W. Hill on Dec. 12, 2000. The alarm apparatus described therein includes a suction cup for secured to the wall of the bathtub. An alarm housing is attached to the top of the suction cup and an alarm system is located within the alarm housing. A float is supported by the alarm housing for activating the alarm when the water in the bathtub reaches a predetermined level.

U.S. Pat. No. 6,480,113 B1 issued to David W. Esposito on Nov. 12, 2002 describes a water level alarm system which comprises a housing, a float, a battery compartment, a speaker and an alarm. The housing is secured to the sides of the water container and the float rises with the water and when it reaches a certain level it makes contact with two separate conductors to complete a circuit and sound an alarm.

Thus, even though there are several prior art systems in use for controlling liquid levels in containers, most commonly in bathtubs, such systems are generally complicated to install and/or difficult to construct and operate.

It is therefore an object of the present invention to provide a liquid level alarm system which is simple to construct, install and operate.

It is another object of this invention to provide a water level control system for bathtubs which is capable of signaling when the water level in the bathtub reaches a certain predetermined level thus alerting the user to shut-off the flow of water into the tub.

It is also an object of the present invention to provide an automatic liquid level detection system for bathtubs and similar containers, which interrupts or reverses the inflow of water automatically when it reaches a predetermined unsafe or undesirable level in the bathtub or the container.

Other features of the present invention will be more fully comprehended and appreciated from the ensuing detailed description which must be read in conjunction with the accompanying drawings.

SUMMARY OF THE INVENTION

The present invention provides a liquid level detection and control system for controlling the liquid level in a bathtub when it reaches a preset level. The system comprises a shut off gate which is hingedly positioned near the liquid discharge outlet, and a sensor which is capable of detecting the liquid level when it reaches said preset level. When the sensor detects the liquid level, it transmits electronic signal to a wireless signal transmitter which, in turn, transmits wireless electronic signal to a receiver. The receiver will then transmit wireless electronic signal to an electronic circuit which transmits the signal to a solenoid valve which is operatively associated with a shut off gate and closes the gate to prevent liquid from rising above the preset liquid level. By closing the water supply faucet, the water level drops, the shut off gate will drop to the open position and water will flow into the tub.

BRIEF DESCRIPTION OF THE DRAWINGS

In the drawings, wherein like reference numerals are used to designate like parts where possible.

DETAILED DESCRIPTION OF THE INVENTION

Figure 1:
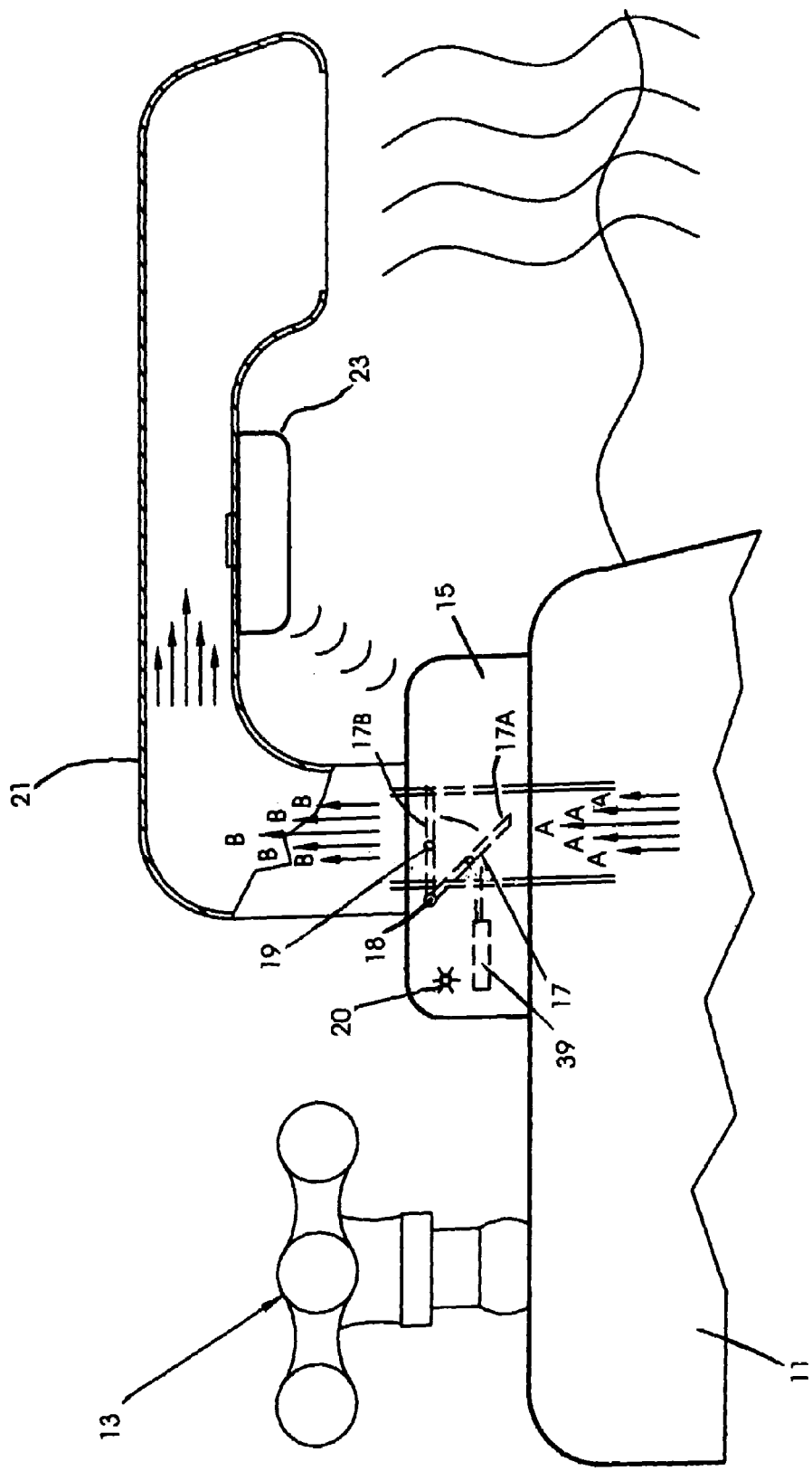
FIG. 1 is a schematic diagram showing the present invention used in a bathtub.

Referring now to the drawings, there is shown in FIG. 1 a bathtub 11 equipped with a faucet handle 13 and a main housing 15 mounted thereon. The main housing 15 comprises a hinged shutoff gate 17 having a seep hole 19, disposed in the liquid inflow path indicated by the arrows A, and an indicator light 20. Ordinarily in residential and commercial bathtubs, the bathtubs are provided with an overflow drain in order to facilitate overflow of water out of the bathtub but sometimes due to malfunction of the drain, water may not be discharged rapidly through the drain thus causing overflow and damage to the surrounding floor. The present device is designed to prevent overflow because when the water level in the tub reaches a preset level, the water stops flowing out through the faucet 21 which is mounted on the main housing, as indicated by the arrows B. This insures that water in the tub will not overflow when it reaches such level as will hereinafter been described. The system of the present invention also comprises a sensor housing 23 which is secured to the faucet 21 and is capable of interacting with the main housing 15 to control the water flow into the tub 11.

Figure 2:
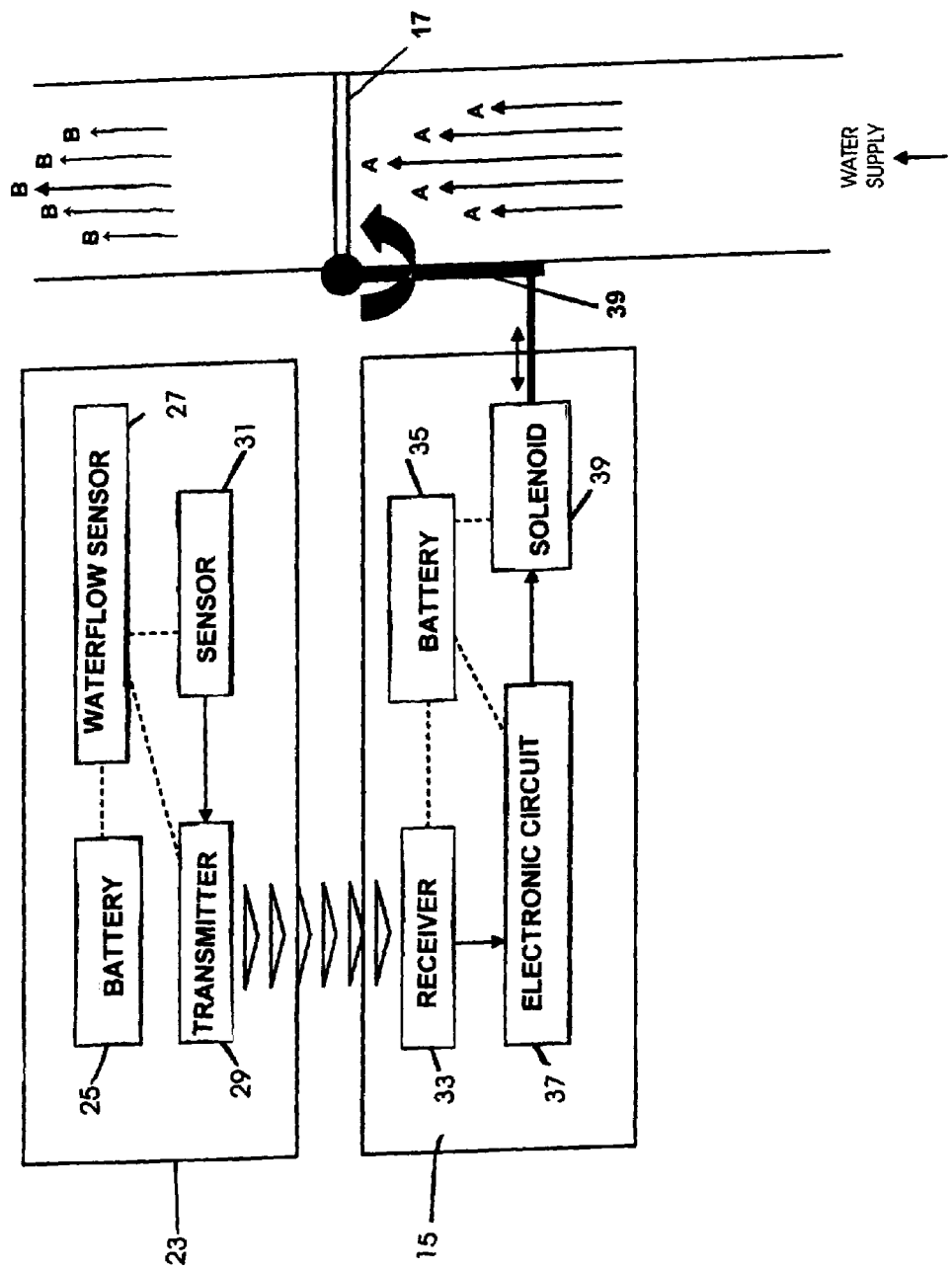
FIG. 2 is a block diagram showing the different components of the system of this invention and the inter-relationship of the components.

Referring to FIG. 2, it can be seen that the sensor housing 23 comprises a battery 25, a waterflow sensor 27, signal transmitter, e.g., a wireless signal transmitter 29 and liquid level sensor 31. The main housing 15 comprises a signal receiver, e.g., a wireless signal receiver 33 which receives electrical signals from the wireless transmitter 29, a battery 35, an electronic control circuit 37 which receives signals from the wireless receiver 33 and activates a solenoid actuator 39.

The liquid level sensor 31 in the sensor housing 23 generates an output signal to the wireless signal transmitter 29 when the water in the tub reaches a preset level. The wireless signal transmitter 29 then transmits an electrical signal to the wireless signal receiver 33 located in the main housing 15. The signal from the receiver 33 is then transmitted to the electronic control circuit 37 which serves to activate the solenoid actuator (valve) 39. The electronic control circuit 37 is capable of activating the devices within the electronic circuit 39 by audible and/or visible signals. The solenoid actuator 39 serves to open or close the hinged shut off gate 17 which is hinged at 18. Thus, when the solenoid actuator is in the inactive status (not receiving any signal) liquid is flowing into the bathtub and the shut off gate 17 is in open position 17A but once it receives a signal from the electronic circuit 37 in response to signal from the sensor 31, it changes to active mode, thus indicating that the flow of water has ceased and the shut off gate 17 is in closed position 17B, as shown in FIG. 1. Both the main housing and the sensor housing include a battery such as battery 25 and battery 35 to provide the source of electrical power to the electronic components of the system.

The system of the present invention can basically exist in three modes, i.e., (A) standby mode, (B) monitor mode, and (C) activated mode. In the standby mode (A), there is no liquid flowing through the system, no power is applied to the sensor 31 no power is used in the main housing 15, and the hinged shut off gate 17 is in open position. In the monitor mode (B) water flows through the faucet, the water flow sensor 27 detects flow, and power is applied to the sensor 31 so that the sensor can detect when the liquid level reaches the preset danger level. No power is used in the main housing 15 and the hinged shut off gate is in its open position. In the activated mode (C), very little liquid flows through the system, no power is applied to the main housing circuitry and the hinged shut off gate is in closed position.

Figure 3:
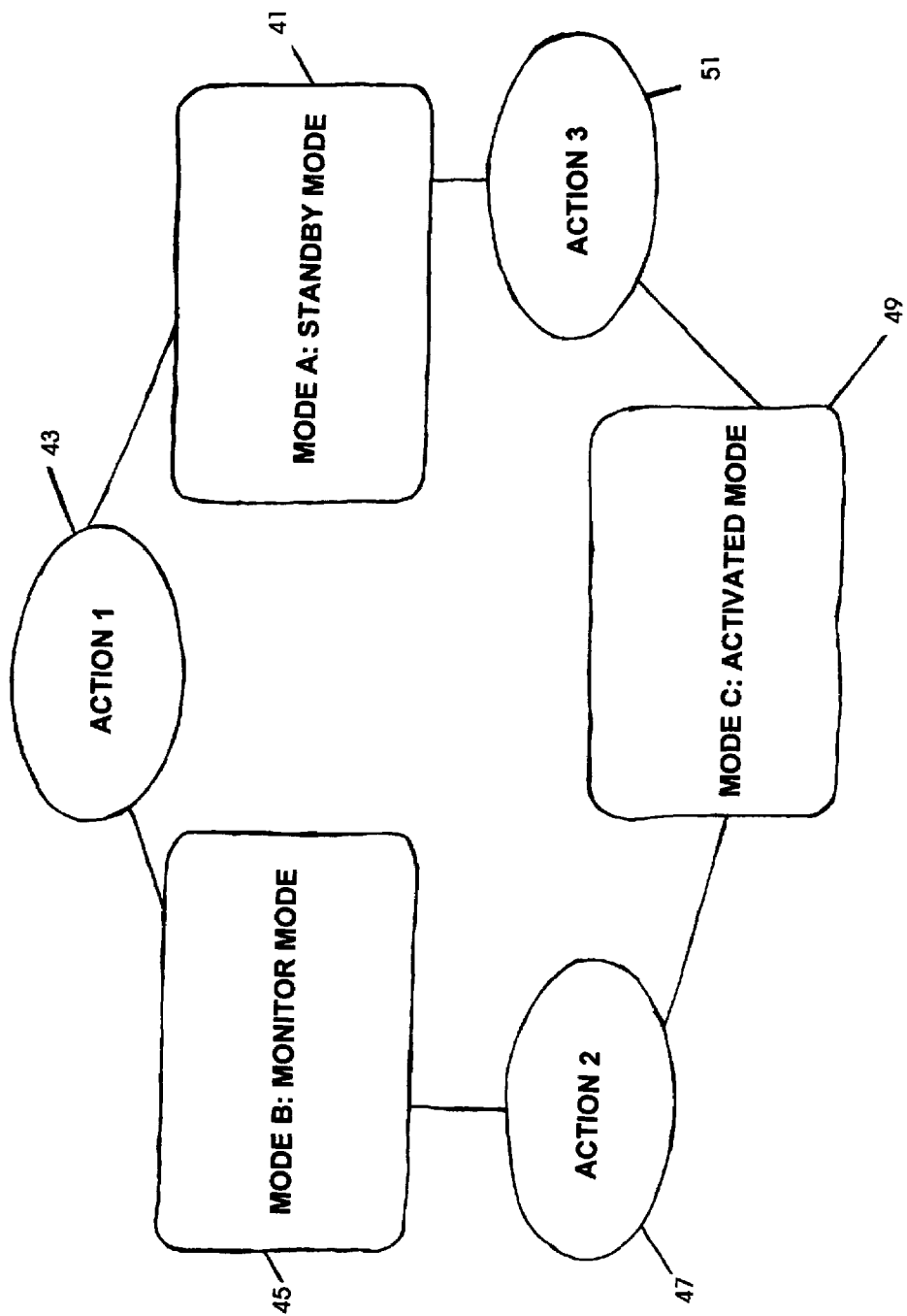
FIG. 3 is another block diagram which shows different modes of operation of the system of the present invention.

In order to change from one mode of operation to another mode, reference may be had to FIG. 3 in the drawings. This figure describes the actions which must take place for transition from one mode to another. In the standby mode (Mode A) as shown by 41 in FIG. 3, no power is applied to the sensor, the water level is not being monitored, the shut off gate 17 is in open position 17A due to water seeping through a seep hole 19 located conveniently in the middle of the shut off gate 17. In the first action, action no. 1, see 43 in FIG. 3, liquid pressure is applied by opening the faucet 13 thus causing the flow of liquid through the system. In the next mode (Mode B) power is applied to the sensor 31, the water level in the bathtub 11 is monitored until it reaches the preset danger level. At this point the solenoid valve 39 is actuated which causes the shut off gate 17 to flip into closed position 17B. In the second action, i.e., Action 2 (see 47 in FIG. 3), liquid flow is stopped since the shut off gate 17 is closed. In the next mode (Mode C, see 49 in FIG. 3), power to the sensor 31 is cut off, the water level in bathtub 11 stops rising, the solenoid valve 39 is momentarily actuated and the shut off gate 17 flips to the closed position. In the next and third action, i.e., Action No. 3, see 51 in FIG. 3, the faucet is closed, water pressure drops slowly due to a few drops of water seeping through the seep hole 19 and the shut off gate will slowly drop from position 17B (closed) to position 17A (open). The system thus changes from Mode C to Mode A as shown in FIG. 3. An indicator light 20 in the main housing 15 provides a signal indicating low battery in the housing.

Thus, as it can be seen, the system described herein provides an efficient and practical system for installation in bathtubs, sinks and the like to control the liquid level at a preset level without the disadvantages of the prior art devices. It can also be appreciated that from the present description one skilled in the art may make several modifications or changes in the system without departing from the scope of this invention.

The invention claimed is:

1. A liquid level detection and control system for controlling liquid level in a bathtub having a faucet and a faucet handle, said faucet having an inlet end for the liquid and an outlet end for discharge of the liquid into the bathtub, said system comprising:
   (a) a main housing operatively associated with said bathtub;
   (b) a sensor housing operatively associated with said main housing;
   (c) a hinged plate member disposed near said inlet of said faucet, said hinged plate member capable of being biased to a flat closed position to prevent liquid from flowing through said faucet and to an open angled position to permit liquid to flow through said faucet;
   (d) an electronic sensor means in said sensor housing capable of detecting the level of liquid in said bathtub and transmitting electronic signals to an electronic transmitter in said sensor housing when said liquid level reaches a preset level;
   (e) an electronic receiver in said main housing for receiving signals from said transmitter and sending electronic signals to an electronic circuit in said main housing; and
   (f) a solenoid actuator in said main housing for receiving signal from said electronic circuit and biasing said hinged plate member to a closed position and prevent liquid flow from said faucet to said bathtub when said liquid level reaches said preset level.

2. A liquid level detection and control system as in claim 1 wherein said sensor housing further comprises a liquid flow sensor for detecting flow of liquid through the system.

3. A liquid level detection and control system as in claim 2 wherein said main housing comprises a battery for providing electrical power.

4. A liquid level detection and control system as in claim 3 wherein said hinged plate member includes a seep hole.

5. A liquid level detection and control system as in claim 2 wherein said hinged plate member includes a seep hole.

6. A liquid level detection and control system as in claim 1 wherein said sensor housing comprises a battery for providing electrical power.

7. A liquid level detection and control system as in claim 6 wherein said hinged plate member includes a seep hole.

8. A liquid level detection and control system as in claim 1 wherein said hinged plate member includes a seep hole.

* * * * *